(12) United States Patent
Geyer et al.

(10) Patent No.: US 10,400,897 B2
(45) Date of Patent: Sep. 3, 2019

(54) ORBITAL SEAT IN A BUTTERFLY VALVE

(71) Applicant: DeZURIK, Inc., Sartell, MN (US)

(72) Inventors: Craig Geyer, Sartell, MN (US); Steven K. Neu, Paynesville, MN (US)

(73) Assignee: DeZURIK, Inc., Sartell, MN (US)

( * ) Notice: Subject to any disclaimer, the term of this patent is extended or adjusted under 35 U.S.C. 154(b) by 310 days.

(21) Appl. No.: 14/786,441

(22) PCT Filed: Apr. 22, 2014

(86) PCT No.: PCT/US2014/035003
§ 371 (c)(1),
(2) Date: Oct. 22, 2015

(87) PCT Pub. No.: WO2014/176262
PCT Pub. Date: Oct. 30, 2014

(65) Prior Publication Data
US 2016/0069459 A1 Mar. 10, 2016

Related U.S. Application Data

(60) Provisional application No. 61/814,652, filed on Apr. 22, 2013.

(51) Int. Cl.
F16K 1/226 (2006.01)
F16K 1/20 (2006.01)
B23P 15/00 (2006.01)

(52) U.S. Cl.
CPC .......... *F16K 1/2263* (2013.01); *B23P 15/001* (2013.01); *F16K 1/205* (2013.01); *F16K 1/2057* (2013.01); *F16K 1/2261* (2013.01)

(58) Field of Classification Search
CPC .... F16K 1/2263; F16K 1/2261; F16K 1/2057; F16K 1/205; F16K 1/222; F16K 27/0218; B23P 15/001
USPC ....... 251/305–308, 315.01–315.16, 314–317
See application file for complete search history.

(56) References Cited

U.S. PATENT DOCUMENTS

| | | | | | |
|---|---|---|---|---|---|
| 1,682,075 A | * | 8/1928 | Foulds | ............... | F16K 1/226 126/285 R |
| 1,977,351 A | * | 10/1934 | Phillips | ............... | F16K 1/2265 251/306 |
| 2,847,181 A | * | 8/1958 | Muller | ............... | F16K 1/2263 251/101 |
| 2,876,984 A | * | 3/1959 | Reppert | ............... | F16K 1/24 251/175 |
| 3,056,576 A | * | 10/1962 | Kulisek | ............... | F16K 5/0626 251/175 |
| 3,072,139 A | * | 1/1963 | Mosites | ............... | F16K 1/2265 137/375 |

(Continued)

FOREIGN PATENT DOCUMENTS

WO 2014176262 10/2014

OTHER PUBLICATIONS

"International Preliminary Report on Patentability," for PCT/US2014/035003, dated Nov. 5, 2015 (9 pages).

(Continued)

*Primary Examiner* — John Bastianelli
(74) *Attorney, Agent, or Firm* — Pauly, DeVries Smith & Deffner LLC

(57) ABSTRACT

A sealing member is described including a surface contacting a valve body that is at least a portion of a sphere.

12 Claims, 17 Drawing Sheets

(56) References Cited

U.S. PATENT DOCUMENTS

| | | | |
|---|---|---|---|
| 3,161,204 A * | 12/1964 | Roy, Sr. | F16K 5/0636 137/315.21 |
| 3,168,900 A * | 2/1965 | Hansen | F16K 5/0689 137/454.6 |
| 3,171,431 A * | 3/1965 | Hansen | F16K 5/0689 137/454.6 |
| 3,404,864 A | 10/1968 | Reddy et al. | |
| 3,521,857 A * | 7/1970 | Over | F16K 1/22 251/173 |
| 3,531,085 A * | 9/1970 | Korzenowski | F16K 5/0689 251/315.08 |
| 3,565,394 A * | 2/1971 | Smith | F16K 1/2265 251/151 |
| 3,648,723 A * | 3/1972 | Nelson | F16K 5/0689 137/454.6 |
| 3,752,181 A | 8/1973 | Clark et al. | |
| 3,834,663 A | 9/1974 | Donnelly | |
| 4,005,848 A * | 2/1977 | Eggleston | F16J 15/3216 251/173 |
| 4,222,412 A * | 9/1980 | Carle | F16K 11/0873 137/375 |
| 4,378,104 A | 3/1983 | Ben-Ur | |
| 4,623,121 A | 11/1986 | Donnelly et al. | |
| 4,637,421 A * | 1/1987 | Stunkard | F16K 5/0636 137/327 |
| 4,890,816 A | 1/1990 | Nicholson | |
| 4,962,911 A | 10/1990 | Soderberg et al. | |
| 5,160,118 A | 11/1992 | Stary | |
| 5,618,026 A * | 4/1997 | Geyer | F16K 1/24 251/298 |
| 5,618,027 A | 4/1997 | Nevrekar | |
| 5,669,350 A * | 9/1997 | Altmann | F02D 9/10 251/306 |
| 5,695,170 A * | 12/1997 | Dernovsek | F16K 1/2265 251/305 |
| 8,161,996 B2 * | 4/2012 | Barker | F16K 1/22 137/269 |
| 2005/0029483 A1 | 2/2005 | Bancroft et al. | |
| 2009/0014675 A1 | 1/2009 | Barker et al. | |
| 2011/0114863 A1 | 5/2011 | Nelson et al. | |

OTHER PUBLICATIONS

"International Search Report and Written Opinion," for PCT/US2014/035003, dated Aug. 25, 2014 (13 pages).

* cited by examiner

ORBITAL SEAT IN A BUTTERFLY VALVE

This application is being filed as a PCT International Patent application on Apr. 22, 2014 in the name of DeZURIK, Inc., a U.S. national corporation, applicant for the designation of all countries and Craig Geyer, a U.S. Citizen, and Steven K. Neu, a U.S. citizen, inventors for the designation of all countries, and claims priority to U.S. Provisional Patent Application No. 61/814,652, filed Apr. 22, 2013, the contents of which are herein incorporated by reference in its entirety.

FIELD OF THE INVENTION

The present invention relates to a seat in a butterfly valve. More specifically, the present invention relates to a seat with a surface that defines a portion of a sphere.

BACKGROUND OF THE INVENTION

Butterfly valves are used in numerous applications around the world. Butterfly valves are frequently used to switch from a position where the valve allows flow through a pipe to a state where they restrict or prohibit flow through a pipe. A disk rotates between a position perpendicular to the flow to a position parallel with the flow, to open and close the valve. A seat is frequently used as a seal between the body of a valve and the disk to help ensure a more complete stop of the flow when the valve is closed. Butterfly valves are often used in harsh environments where damage to the valve is more common. In harsh environments, it can be difficult to maintain a fluid tight seal between the seat, the body of the valve, and the disk.

SUMMARY OF THE INVENTION

Embodiments of the invention include a sealing member for a butterfly valve. The sealing member can include an outside surface configured to engage with at least a portion of a valve body. The outside surface of the sealing member can be spherical, in that it can define a portion of a sphere. The sealing member can also include a disk engaging surface that is configured to engage at least a portion of a disk. The disk engaging surface can also define a portion of a sphere. Further, the surface of the disk that contacts the sealing member can also define a portion of a sphere. The sealing member along with the disk can substantially prohibit the flow of fluid through a valve when the disk is in a closed position.

This summary is an overview of some of the teachings of the present application and is not intended to be an exclusive or exhaustive treatment of the present subject matter. Further details are found in the detailed description and appended claims. Other aspects will be apparent to persons skilled in the art upon reading and understanding the following detailed description and viewing the drawings that form a part thereof, each of which is not to be taken in a limiting sense. The scope of the present invention is defined by the appended claims and their legal equivalents.

BRIEF DESCRIPTION OF THE FIGURES

The invention may be more completely understood in connection with the following drawings, in which.

Figure 1:
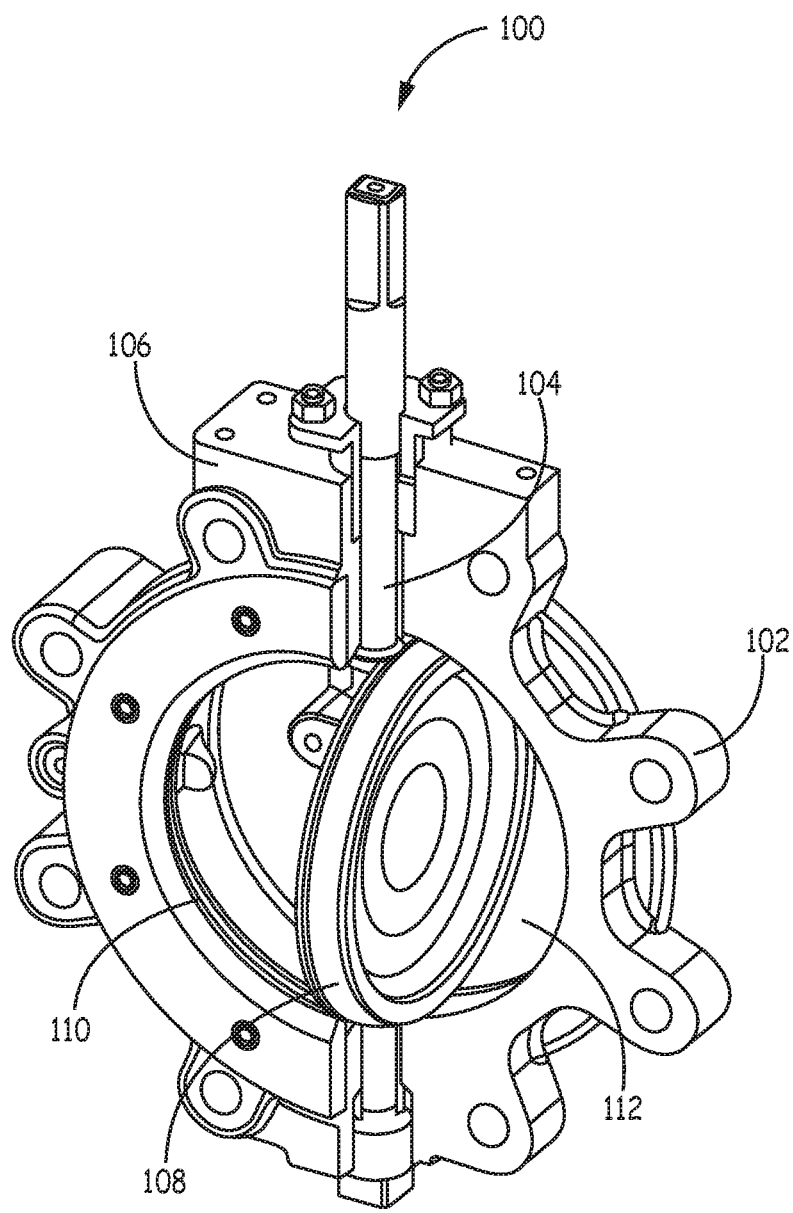
FIG. 1 is a perspective view of a butterfly valve.

While the invention is susceptible to various modifications and alternative forms, specifics thereof have been shown by way of example and drawings, and will be described in detail. It should be understood, however, that the invention is not limited to the particular embodiments described. On the contrary, the intention is to cover modifications, equivalents, and alternatives falling within the spirit and scope of the invention.

DETAILED DESCRIPTION OF THE INVENTION

The embodiments of the present invention described herein are not intended to be exhaustive or to limit the invention to the precise forms disclosed in the following detailed description. Rather, the embodiments are chosen and described so that others skilled in the art can appreciate and understand the principles and practices of the present invention.

All publications and patents mentioned herein are hereby incorporated by reference. The publications and patents disclosed herein are provided solely for their disclosure. Nothing herein is to be construed as an admission that the inventors are not entitled to antedate any publication and/or patent, including any publication and/or patent cited herein.

A butterfly valve is described herein which is more easily assembled and provides better shutoff capabilities. Butterfly valves are frequently used in piping systems to allow fluids to flow through the system when the valve is open and to stop fluids from flowing when the valve is closed.

In one embodiment of an improved butterfly valve, a sealing member is provided that is easily positioned to provide a more complete seal when the butterfly valve is in a closed position. The sealing member can include an outer surface that contacts the valve body. The outer surface of the sealing member can define a portion of a sphere. The portion of the valve body that the outer surface contacts can define a cylinder.

In one embodiment, the sealing member can include a surface that engages the disk, when the disk is in a closed position. The surface can define at least a portion of a sphere or a portion of a cone. Similarly, the surface of the disk that engages with the sealing member can define at least a portion of a sphere or a portion of a cone.

In an embodiment, the surface of the disk that engages with the sealing member can include a soft seat or a laminated seat. In an embodiment, the surface of the sealing member that engages with the disk can further include a soft seat or a laminated seat. The soft seat or laminated seat can aid in providing a more complete seal to prevent the flow of fluid when the valve is in a closed position.

In addition to providing a more complete and reliable seal the improved butterfly valve can be assembled and installed more easily compared to other butterfly valves. The sealing member can be placed into a cavity at least partially defined by the valve body and the disk. The spherical surfaces of the sealing member, allow the sealing member to easily find the appropriate alignment with the disk and the valve body. Packing material can be added around a portion of the sealing member to help secure the sealing member in its desired alignment. A cap member can be coupled to the valve body to enclose the sealing member within the valve. The sealing member can be installed in the valve while still in a manufacturing facility and therefore allowing the valve to be quickly and easily installed into a piping system in the field without the need to install and align the sealing member.

FIG. 1 shows a view of a butterfly valve 100. Butterfly valves 100 can be used in piping systems such as to allow the passage of fluids through the valve when the butterfly valve is open and prevent the passage of fluids when the butterfly valve is closed. A butterfly valve 100 can comprise a valve body 102, a shaft 104, a neck 106, a disk 108, and a seat 110.

The body 102 can serve as a housing for the butterfly valve 100, such as to provide a common structure for other components to be coupled to and provide structural support for the butterfly valve 100. The body 102 can define a central aperture 112, such as for fluids (gases or liquids) to pass through the butterfly valve 100. The disk 108 can pivot from a position perpendicular to the flow of fluids through the butterfly valve 100, such as to close the butterfly valve 100 and substantially prevent the flow through the aperture 112 to a position parallel to the flow, an open position, such as to allow the fluids to flow through the aperture 112.

The disk 108 can be coupled to the shaft 104. The shaft 104 can be coupled to an actuator or a handle, such as to pivot the disk 108 from an open position to a closed position and from a closed position to an open position. The shaft 104 can extend through the neck 106. The neck 106 can provide structural stability for the shaft 104, or provide a mounting for an actuator.

A seat 110 can be coupled to the body 102, such as by a clamping member. The seat 110 can act as a seal between the disk 108 and the body 102, such as by preventing, in concert with the disk 108, the flow of fluid through the central aperture 112, when the disk 108 is in a closed position. Without a seat 110, when the disk 108 is in a closed position, there can be a small opening between the disk 108 and the body 102. The seat 110 can occupy the opening thereby helping to prevent the flow of fluid through the aperture 112.

Figure 2:
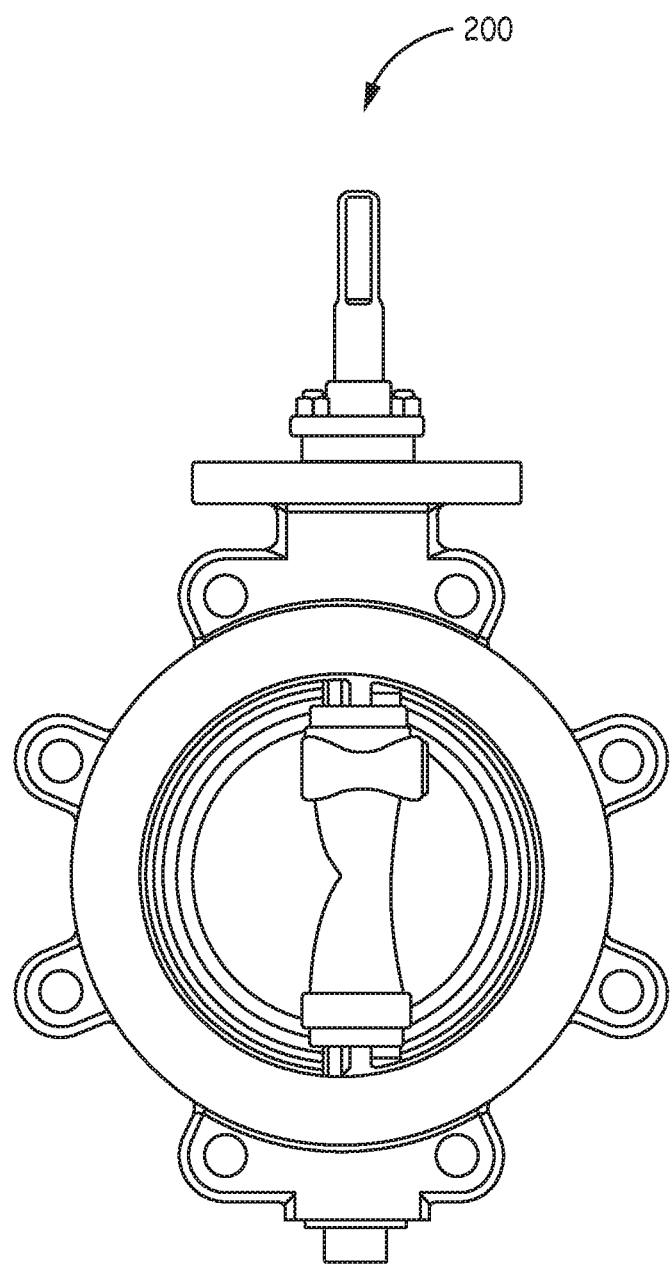
FIG. 2 is a front view of a butterfly valve with three offsets.

Referring now to FIG. 2, a butterfly valve 200 with three offsets is shown, frequently referred to as a triple offset. In harsh environments, such as piping systems transporting oil, gas, or waste water, valves can wear over time decreasing the ability to properly shutoff the flow a fluid through the valve. In response to valves losing their fluid tight seal, offsets were developed.

A first offset was developed to have increased sealing abilities. A first offset includes having the axis of the shaft behind the center line of the sealing point of the disk. Further to reduce torque and friction between the disk and the seat, a second offset was developed. A second offset includes the axis of the shaft being eccentric to the center of the valve and the pipe it is connected to. To decrease abrasions of the seat caused by the disk pivoting from an open position to a closed position, a third offset was developed. A third offset includes the disk being a portion of a cone and corresponding cone angles in the body.

Figure 3:
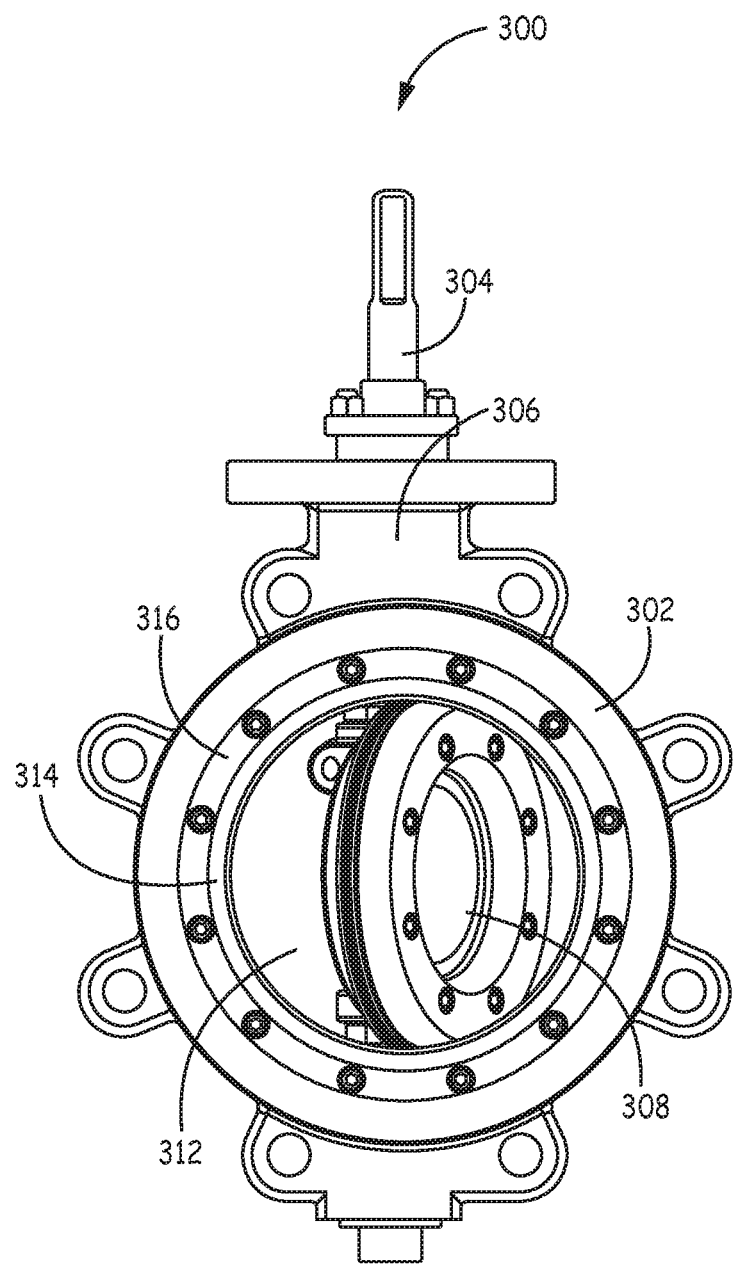
FIG. 3 is a front view of a butterfly valve, according to an embodiment.

In FIG. 3 a view of a butterfly valve 300 is shown, according to an embodiment. The butterfly valve 300 can include a valve body 302, a shaft 304, a neck 306, and a disk 308. The butterfly valve 300 can include a sealing member 314, such as to occupy a cavity between the disk 308 and the valve body 302, when the disk 308 is in a closed position. The butterfly valve 300 can include a cap member 316, such as to at least partially enclose the sealing member 314 within a cavity. The valve body 302 can define an aperture 312, such as to allow fluids to pass through the valve 300 when the disk 308 is in an open position (parallel with the fluid flow). The disk 308 can rotate from an open position, allowing fluid to flow through the aperture 312 to a closed position (perpendicular with the fluid flow), substantially prohibiting fluid from flowing through the aperture 312. The sealing member 314 can be disposed between the disk 308 and valve body 302, such as to help prohibit the flow of fluid when the disk 308 is in a closed position.

Figure 4:
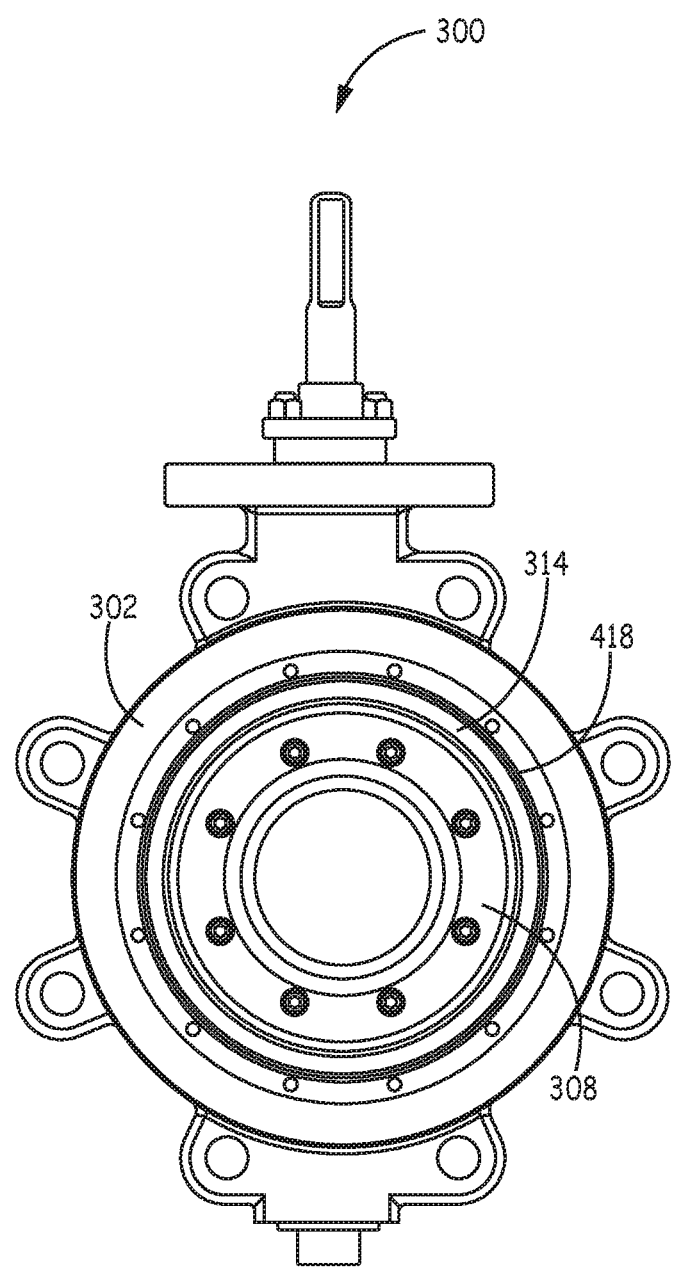
FIG. 4 is a front view of a butterfly valve without the cap member, according to an embodiment.

FIG. 4 shows a view of a butterfly valve 300, with the disk 308 in a closed position and with the cap member removed showing the sealing member 314 partially occupying a cavity. As visible in FIG. 4, with the cap member 316 removed, the sealing member 314 can contact the valve body 302 and the disk 308, such as to prevent fluid from flowing between the valve body 302 and disk 308 when the disk 308 is in a closed position. In an embodiment packing material can be packed into the cavity 418 around the valve body 302 and the sealing member 314, such as to help keep the sealing member 314 in its desired alignment with the valve body 302 and the disk 308.

Figure 5:
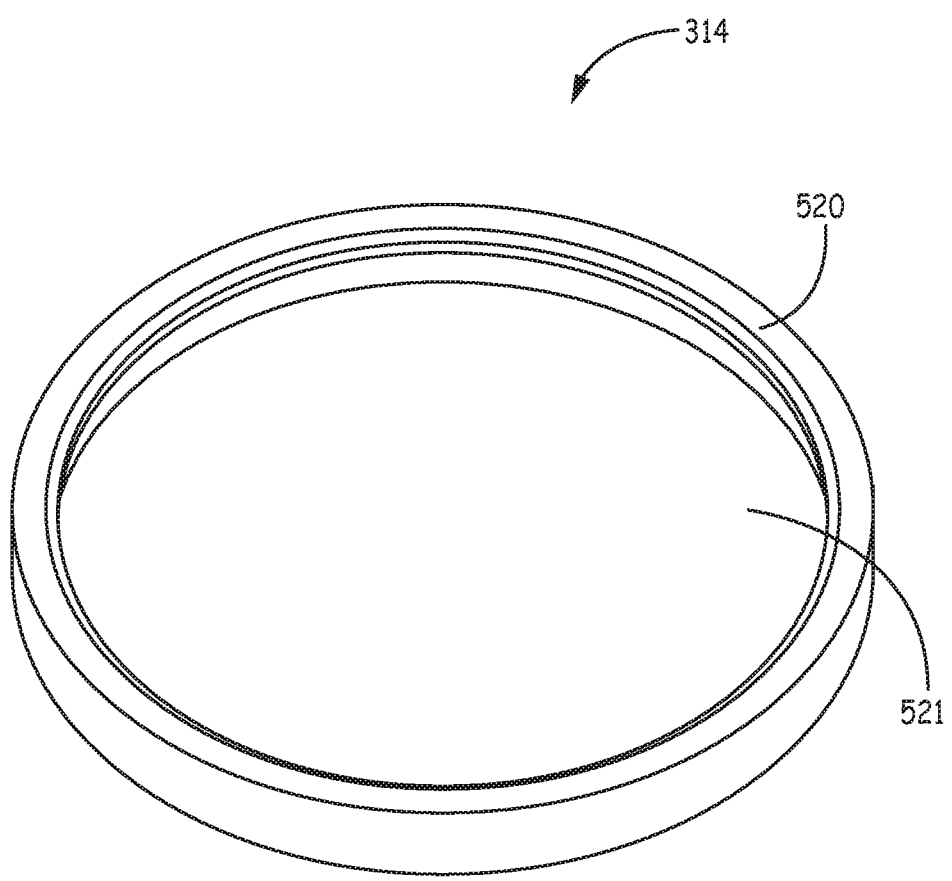
FIG. 5 is a view of a sealing member, according to an embodiment.
Figure 6:
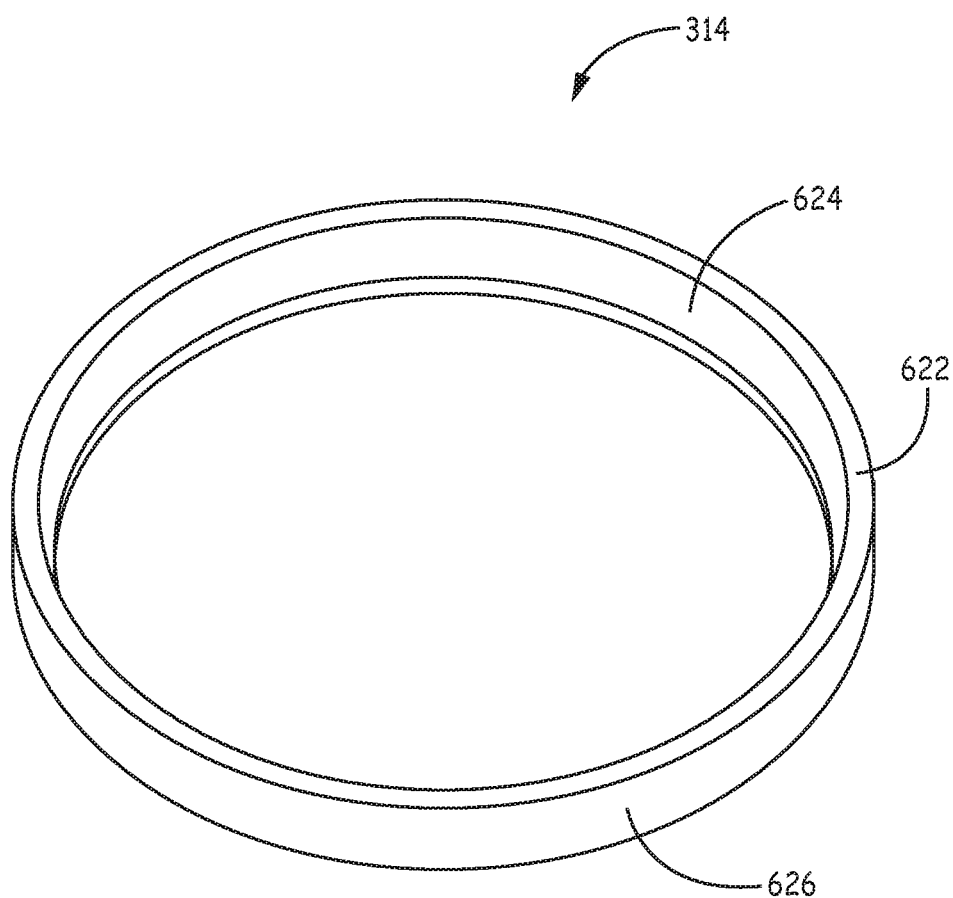
FIG. 6 is a view of a sealing member, according to an embodiment.

A top perspective view of a sealing member 314 is shown in FIG. 5, according to an embodiment. A bottom perspective view of a similar sealing member 314 is shown in FIG. 6. The sealing member 314 can include a top surface 520, such as the surface that is orientated at the flow of fluid through the valve 300. The top surface 520 can be planar, such as to closely resemble a planar surface of the cap member 316. The sealing member 314 can be ring shaped and define an aperture 521, such as for fluid to pass through when the disk 308 is in an open position. The aperture 521 can align with the aperture 312 to create a path for fluid to travel through the valve 300.

The sealing member 314 can include a bottom surface 622, a disk engaging surface 624, and an outside surface 626. The bottom surface 622 can be planar, such as to closely resemble a planar surface of the valve body 302. The bottom surface 622 and the top surface 520 can be parallel. The disk engaging surface 624 can define a portion of a sphere, such as to closely resemble a surface of the disk 308. The outside surface 626 can define a portion of a sphere, such as a portion of the surface area of a sphere. In an embodiment, the outside surface 626 can define a portion of a sphere, such as a portion that include the equator of the sphere and an area above the equator and an area below the equator. In an embodiment, the area above the equator and the area below the equator can be equal. The outside surface 626 can define a portion of a sphere, such that when sealing member 314 is placed in a valve body 302 the sealing member can find an alignment with the valve body 302 and the disk 308 to provide a fluid tight seal. The outside surface 626 can define a portion of a sphere; such that the sealing member 314 can have a numerous number of positions it can assume relative to the valve body 302 and maintain a fluid tight valve. The sealing member 314 can have an infinite range of adjustability with respect to the valve body 302 and the disk 308. The sealing member 314 can assume as many offsets as necessary to arrive at a fluid tight seal with the disk 308.

Figure 7:
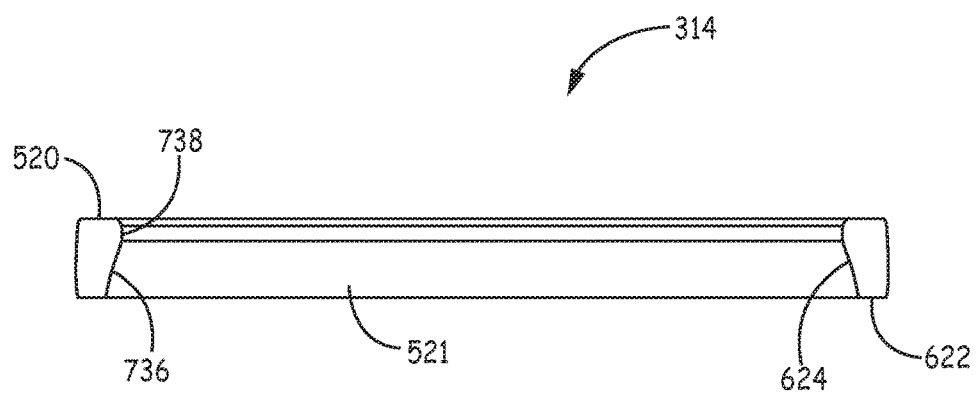
FIG. 7 is a cross-section of a sealing member, according to an embodiment.

FIG. 7 shows a cross-section of a sealing member 314, according to an embodiment. The sealing member 314 can be ring shaped, such that a cross section includes a right portion and a left portion that are essentially mirrored images of one another. The aperture 521 can be located between the right portion and the left portion. The disk engaging surface 624 can define a portion of a sphere or a cone.

The sealing member 314 can include an inner surface 736, such as the portion of the sealing member 314 that defines the aperture 521. The inner surface 736 can comprise the disk engaging surface 624 and a non-engaging surface 738.

Figure 8:
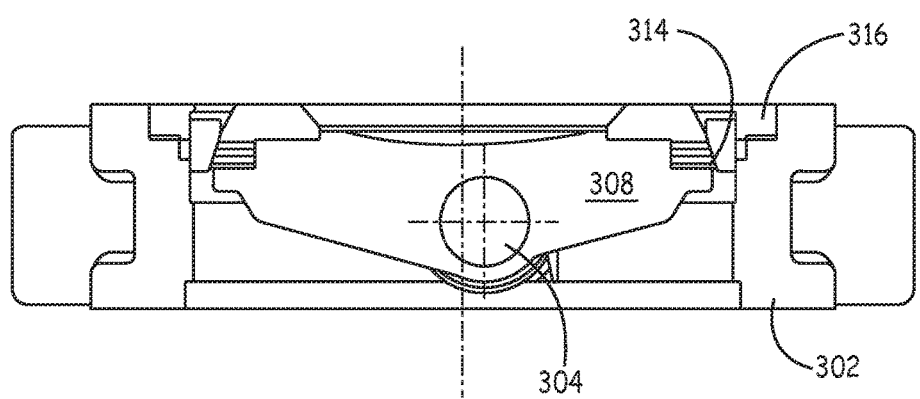
FIG. 8 is a cross-section of a valve, according to an embodiment.

FIG. 8 shows a cross section of butterfly valve 300. Butterfly valve 300 can include a shaft 304 that is located behind the disk 308 or behind the middle of the disk 308, similar to the first offset discussed above. Valve 300 can include a shaft 304 that is offset from the center line of the disk 308 or the aperture 314, similar to the second offset discussed above. Valve 300 can include a disk 308. At least a portion of disk 308 can define at least a portion of a sphere or a cone.

Figure 9:
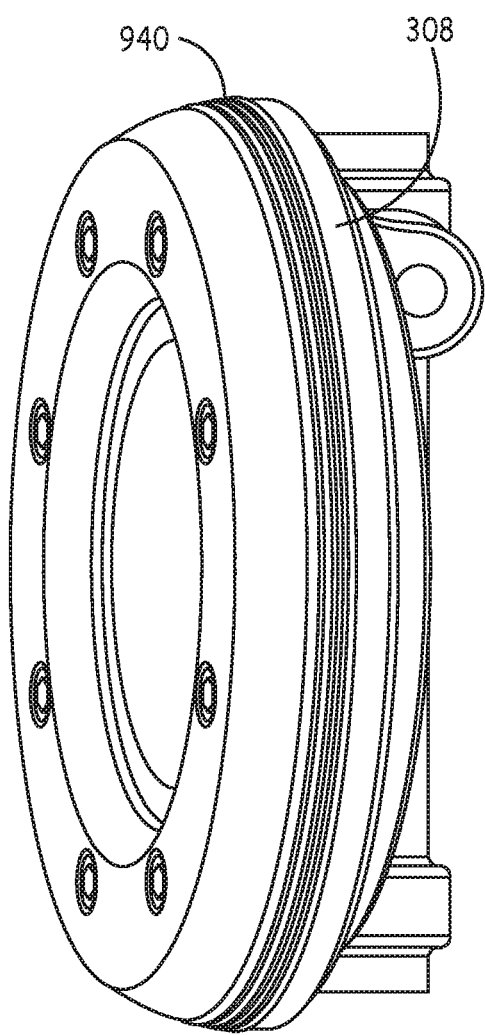
FIG. 9 is a view of a disk, according to an embodiment.

FIG. 9 shows a view of a disk 308. The outside surface 940 of the disk 308 can define a portion of a sphere or a cone. The disk 308 can comprise the same materials as one or more of the following: the valve body 302, the sealing member 314, or the cap member 316.

The disk 308 can include a seal edge such as to create a fluid tight seal between the sealing member 314 and the disk 308 when the disk 308 is in a closed position. The seal edge can comprise Teflon, rubber, laminate, or graphite. The seal edge can comprise a softer material than the sealing member 314 or the disk 308, such that the seal edge can wear at a different rate than the sealing member 314 or the disk 308 when the valve 300 is in use.

Figure 10:
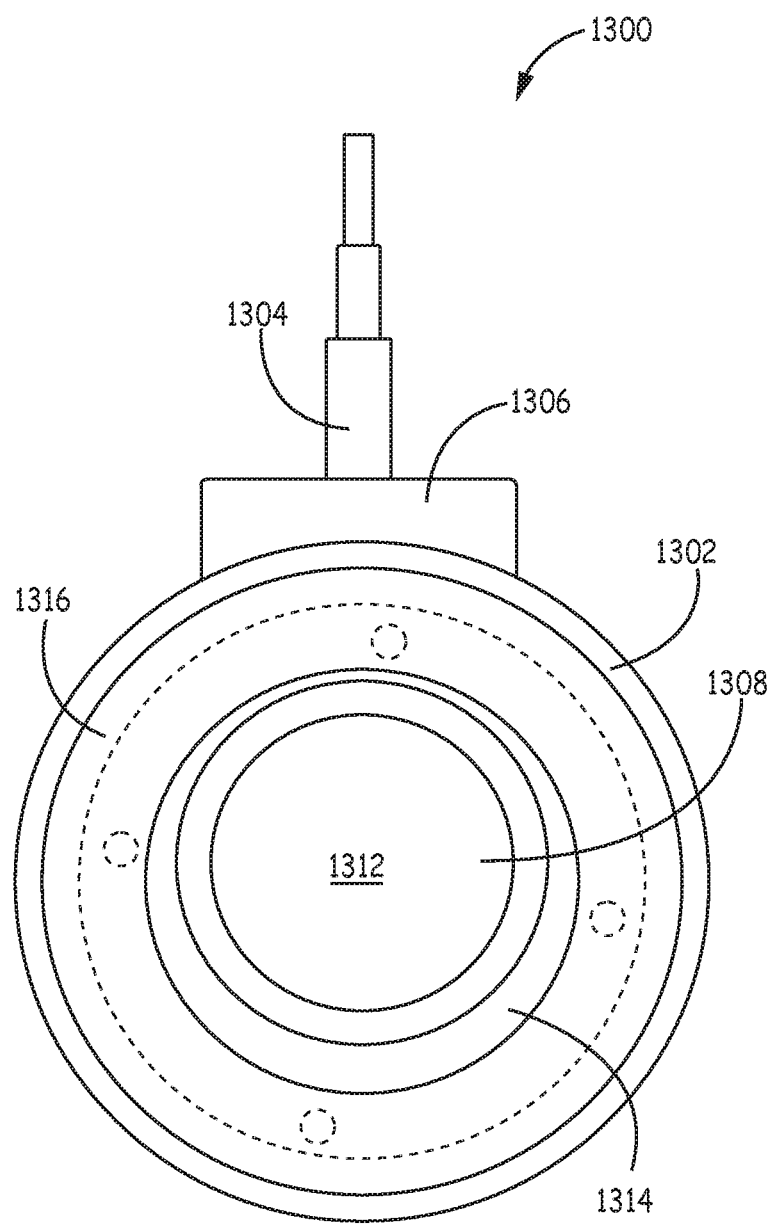
FIG. 10 is a view of a butterfly valve, according to an embodiment.

In an embodiment, the seal edge is a portion of the outside surface 960 of the disk, such that the seal edge and outside surface 960 can both be at least partially in contact with the sealing member 314 when the disk 308 is in a closed position. In an embodiment, the seal edge can be slightly deformed by the disk 308 (in a closed position) and the sealing member 314 when the disk 308 is in a closed position, such as to provide a fluid tight seal. In an embodiment, the seal edge can be consistent with the outside surface 960 of the disk, such as being consistent with defining a portion of a sphere or a cone. In an alternative embodiment, the seal edge can be inconsistent with the portion of the sphere. In FIG. 10 a view of a butterfly valve 1300 is shown, according to an embodiment. The butterfly valve 1300 can include a valve body 1302, a shaft 1304, a neck 1306, and a disk 1308. The butterfly valve 1300 can include a sealing member 1314, such as to occupy a cavity between the disk 1308 and the valve body 1302, when the disk 1308 is in a closed position. The butterfly valve 1300 can include a cap member 1316, such as to at least partially enclose the sealing member 1314 within a cavity. The valve body 1302 can define an aperture 1312, such as to allow fluids to pass through the valve 1300 when the disk 1308 is in an open position (parallel with the fluid flow). The disk 1308 can rotate from an open position, allowing fluid to flow through the aperture 1312 to a closed position (perpendicular with the fluid flow), substantially prohibiting fluid from flowing through the aperture 1312. The sealing member 1314 can be disposed between the disk 1308 and valve body 1302, such as to help prohibit the flow of fluid when the disk 1308 is in a closed position.

Figure 11:
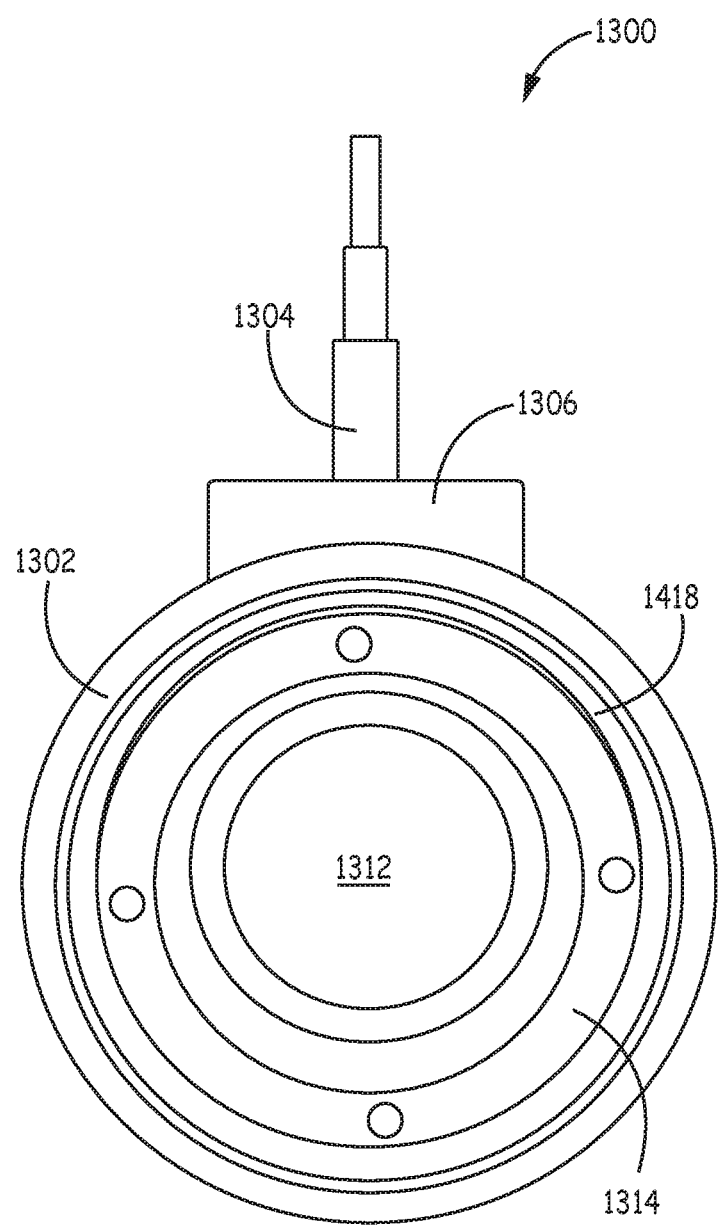
FIG. 11 is a view of a butterfly valve without the cap member, according to an embodiment.

FIG. 11 shows a view of a butterfly valve 1300, with the cap member removed showing the sealing member 1314 partially occupying a cavity. As visible in FIG. 11, with the cap member 1316 removed, the sealing member 1314 can contact the valve body 1302 and the disk 1308, such as to prevent fluid from flowing between the valve body 1302 and disk 1308 when the disk 1308 is in a closed position. In an embodiment packing material can be packed into the cavity 1418 around the valve body 1302 and the sealing member 1314, such as to help keep the sealing member 1314 in its desired alignment with the valve body 1302 and the disk 1308.

Figure 12:
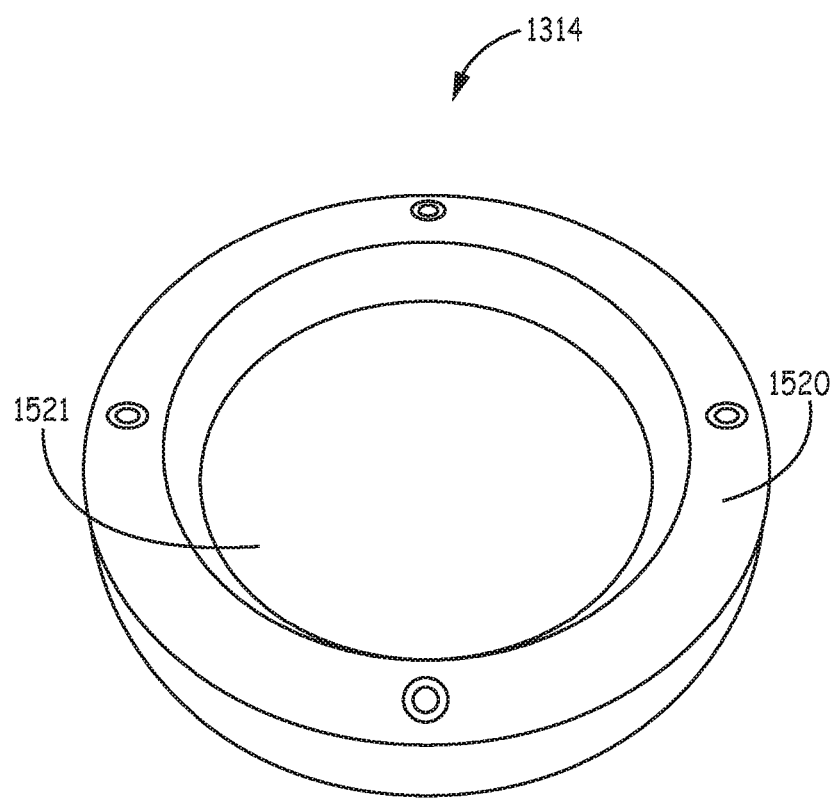
FIG. 12 is a view of a sealing member, according to an embodiment.
Figure 13:
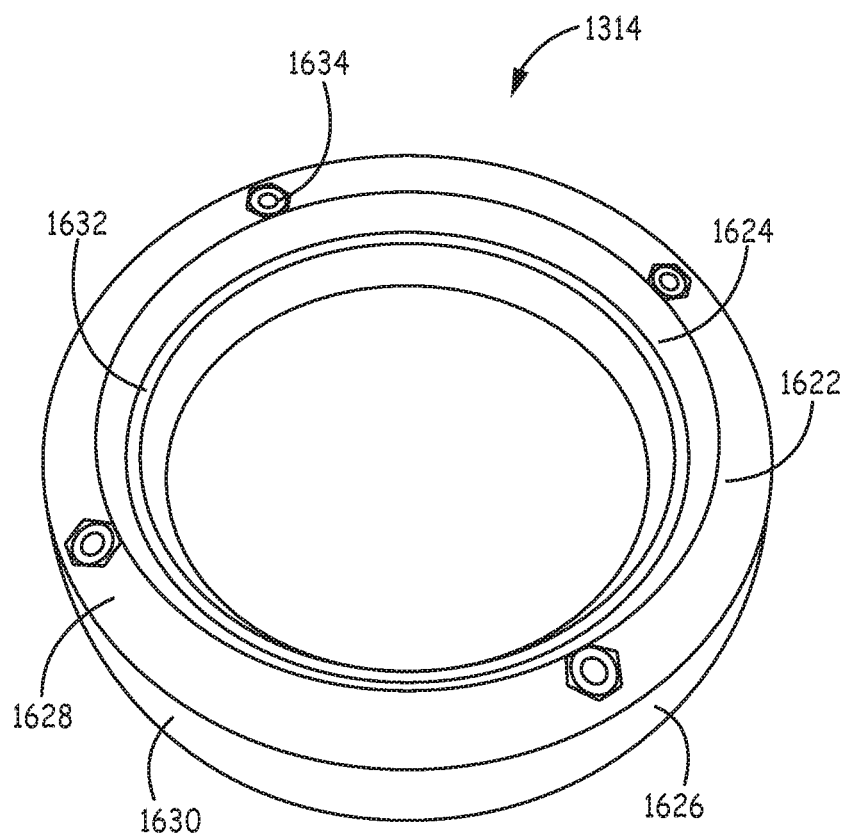
FIG. 13 is a view of a sealing member, according to an embodiment.

A top view of a sealing member 1314 is shown in FIG. 12, according to an embodiment. A bottom view of a similar sealing member 1314 is shown in FIG. 13. The sealing member 1314 can include a top surface 1520, such as the surface that is orientated at the flow of fluid through the valve 1300. The top surface 1520 can be planar, such as to closely resemble a planar surface of the cap member 1316. The sealing member 1314 can be ring shaped and define an aperture 1521, such as for fluid to pass through when the disk 308 is in an open position. The aperture 1521 can align with the aperture 1312 to create a path for fluid to travel through the valve 1300.

The sealing member 1314 can include a bottom surface 1622, a disk engaging surface 1624, and an outside surface 1626. The bottom surface 1622 can be planar, such as to closely resemble a planar surface of the valve body 1302. The bottom surface 1622 and the top surface 1520 can be parallel. The disk engaging surface 1624 can define a portion of a sphere, such as to closely resemble a surface of the disk 1308. The outside surface 1626 can define a portion of a sphere, such that when sealing member 1314 is placed in a valve body 1302 the sealing member can find an alignment with the valve body 1302 and the disk 1308 to provide a fluid tight seal.

The sealing member 1314 can comprise a first portion 1628 and a second portion 1630. The first portion 1628 and the second portion 1630 can be coupled together to define a cavity, such as with connectors 1634. The cavity can be at least partially occupied by a soft seat 1632. The first portion 1628 and the second portion 1630 can comprise metal. The soft seat 1632 can comprise Teflon, rubber, laminate, or graphite. The soft seat 1632 can comprise a softer material than the first portion 1628 and the second portion 1630, such that the soft seat 1632 can wear at a different rate than the first portion 1628 and the second portion 1630 when the sealing member 1314 is in use.

In an embodiment, the soft seat 1632 is a portion of the disk engaging surface 1624, such that the soft seat 1632 and the seat engaging surface 1624 can both be in contact with the disk 1308 when the disk 1308 is in a closed position. In an embodiment, the soft seat 1632 can be slightly deformed by the disk 1308 (in a closed position), to provide a fluid tight seal.

Figure 14:
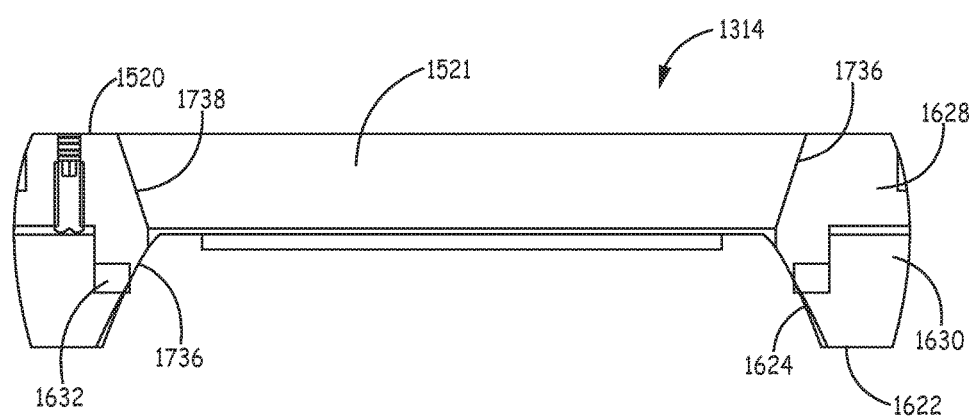
FIG. 14 is a cross-section of a sealing member, according to an embodiment.

FIG. 14 shows a cross-section of a sealing member 1314, according to an embodiment. The sealing member 1314 can be ring shaped, such that a cross section includes a right portion and a left portion that are essentially mirrored images of one another. The aperture 1521 can be located between the right portion and the left portion. The disk engaging surface 1624 defined by the first portion 1628 and the second portion 1630 can define a portion of a sphere. In an embodiment, the soft seat 1632 can be consistent with the portion of the sphere. In an alternative embodiment, the soft seat 1632 can be inconsistent with the portion of the sphere (as show in FIG. 14).

The sealing member 1314 can include an inner surface 1736, such as the portion of the sealing member 1314 that defines the aperture 1521. The inner surface 1736 can comprise the disk engaging surface 1624 and a non-engaging surface 1738.

Figure 15:
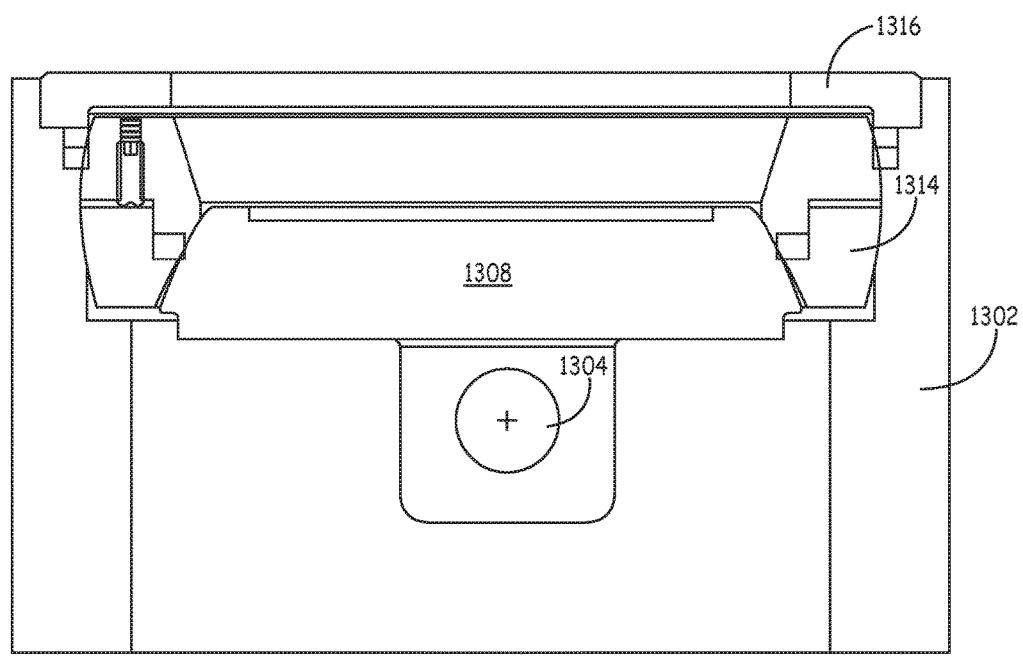
FIG. 15 is a cross-section of a valve, according to an embodiment.

FIG. 15 shows a cross section of butterfly valve 1300. Butterfly valve 1300 can include a shaft 1304 that is located behind the disk 1308, similar to the first offset discussed above. Valve 1300 can include a shaft 1304 that is offset from the center line of the disk 1308 or the aperture 1314, similar to the second offset discussed above. Valve 1300 can include a disk 1308. At least a portion of disk 1308 can define at least a portion of a sphere.

Figure 16:
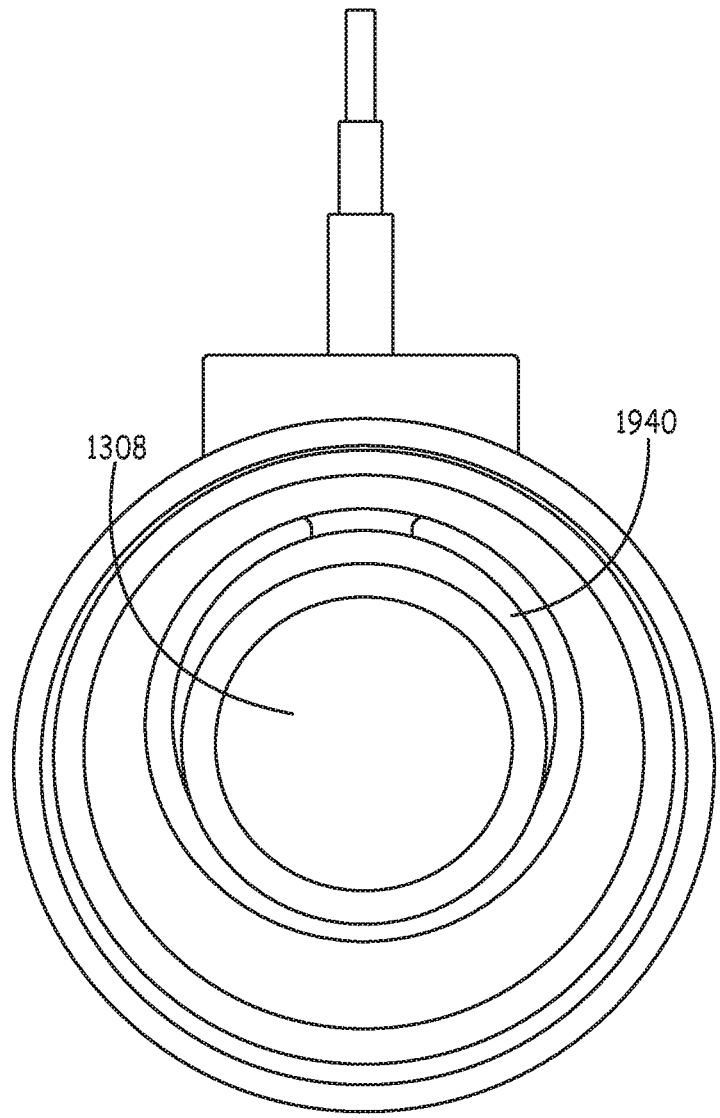
FIG. 16 is a view of a disk, according to an embodiment.

FIG. 16 shows a view of a disk 1308. The outside surface 1940 of the disk 1308 can define a portion of a sphere. The disk 1308 can comprise the same materials as one or more of the following: the valve body 1302, the first portion 1628 of the sealing member 1314, and the second portion 1630 of the sealing member 1314.

Figure 17:
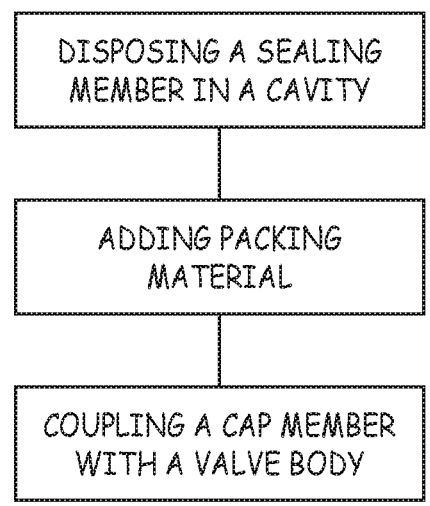
FIG. 17 is a flow chart depicting a method of assembling a butterfly valve, according to an embodiment.

FIG. 17 is a flow chart depicting a method of assembling the sealing member in the butterfly valve, according to an embodiment. With the disk in a closed position, the sealing member can be disposed in the cavity defined by the valve body and the disk. The sealing member can encircle at least a portion of the disk 308, when the sealing member is in its desired location. Packing material can be added around a portion of the sealing member, such as a cavity defined by the sealing member and the valve body. The cap member can be coupled to the valve body, such as to at least partially enclose the sealing member within a cavity defined by the cap member, the valve body and the disk.

It should be noted that, as used in this specification and the appended claims, the singular forms "a," "an," and "the" include plural referents unless the content clearly dictates otherwise. Thus, for example, reference to a composition containing "a compound" includes a mixture of two or more compounds. It should also be noted that the term "or" is generally employed in its sense including "and/or" unless the content clearly dictates otherwise.

It should also be noted that, as used in this specification and the appended claims, the phrase "configured" describes a system, apparatus, or other structure that is constructed or configured to perform a particular task or adopt a particular configuration to. The phrase "configured" can be used interchangeably with other similar phrases such as arranged and configured, constructed and arranged, constructed, manufactured and arranged, and the like.

All publications and patent applications in this specification are indicative of the level of ordinary skill in the art to which this invention pertains. All publications and patent applications are herein incorporated by reference to the same extent as if each individual publication or patent application was specifically and individually indicated by reference.

The invention has been described with reference to various specific and preferred embodiments and techniques. However, it should be understood that many variations and modifications may be made while remaining within the spirit and scope of the invention.

The invention claimed is:

1. A valve comprising a sealing member disposed in the valve, the valve comprising:
   a valve body comprising an aperture;
   a sealing member surrounding the aperture in the valve body;
   packing material positioned between the valve body and the sealing member, the packing material preserving the alignment of the sealing member relative to the aperture in the valve body;
   a disk comprising a first surface configured to engage with at least a portion of the sealing member secured to the valve body;
   a disk engaging surface configured to engage with at least a portion of the first surface of the disk; the disk engaging surface formed in the sealing member having a ring shape;
   wherein the outside surface of the disk defines at least a portion of a sphere;
   further comprising a shaft extending through the aperture; wherein the shaft is coupled to the disk; and the shaft is positioned behind the disk and offset from the center line of the disk; and
   wherein a portion of the sealing member in contact with the valve body defines a portion of a sphere.

2. The valve of claim 1, wherein the disk engaging surface comprises a non-metal portion.

3. The valve of claim 1, wherein the sealing member comprises a top surface and a bottom surface.

4. The valve of claim 1, wherein the sealing member comprises a top surface, a bottom surface, and an inner surface.

5. The valve of claim 4, wherein:
   the sealing member is ring shaped;
   the top surface is parallel with the bottom surface; and
   the inside surface and the disk engaging surface define an inner portion of the ring shape.

6. A butterfly valve, the butterfly valve comprising:
   a valve body defining an aperture;
   a disk, configured to rotate from a position substantially preventing fluid flow through the aperture to a position allowing fluid flow through the aperture;
   a sealing member disposed between the disk and the valve body when the disk is in a position substantially preventing fluid flow through the aperture; the sealing member retained in place by packing material, the packing material positioned between the valve body and sealing member, the packing material preserving the alignment of the sealing member relative to the aperture in the valve body;
   a shaft extending through the aperture; wherein the shaft is coupled to the disk; and the shaft is positioned behind the disk and offset from the center line of the disk; and
   wherein a portion of the sealing member in contact with the valve body defines a portion of a sphere.

7. The butterfly valve of claim 6, wherein an outside surface of the disk defines a portion of a sphere.

8. The butterfly valve of claim 6, wherein the portion of the sealing member in contact with the disk is configured to contact the disk when the disk is in a position substantially preventing fluid flow through the aperture.

9. The butterfly valve of claim 6, wherein the disk comprises a soft seat configured to engage a portion of the sealing member, when the disk is in a position substantially preventing fluid flow through the aperture.

10. The butterfly valve of claim 6, comprising a cap member;
   wherein the cap member and the valve body define a cavity and the sealing member is partially disposed within the cavity.

11. The butterfly valve of claim 6, wherein the disk comprises a soft seat disposed around at least a portion of the disk.

12. The butterfly valve of claim 11, wherein the soft seat comprises at least one of the following rubber, laminate, or graphite.

\* \* \* \* \*